D. PARRETT.
MOTOR VEHICLE.
APPLICATION FILED JUNE 25, 1915.
1,231,292.
Patented June 26, 1917.
3 SHEETS—SHEET 1.
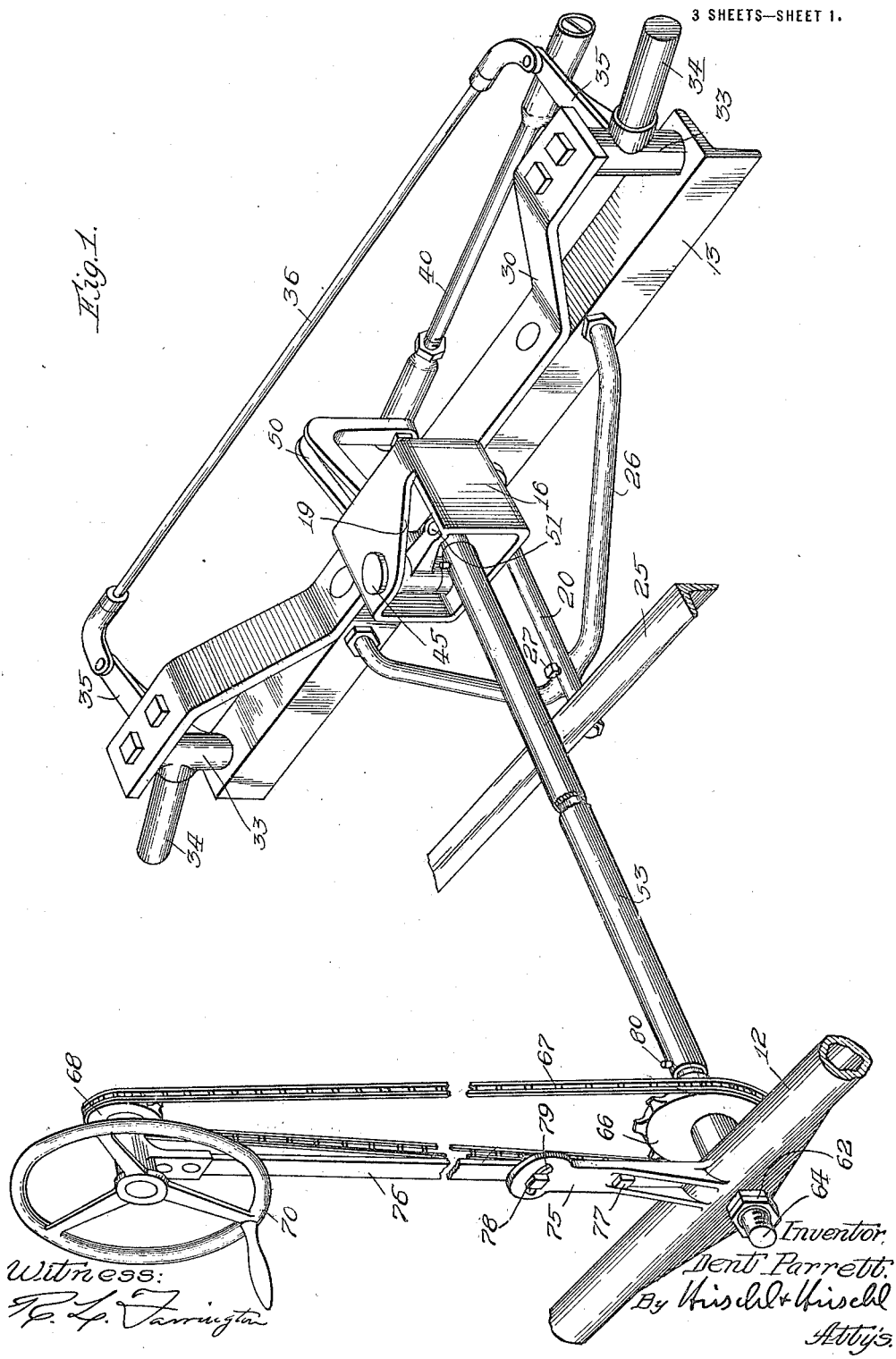

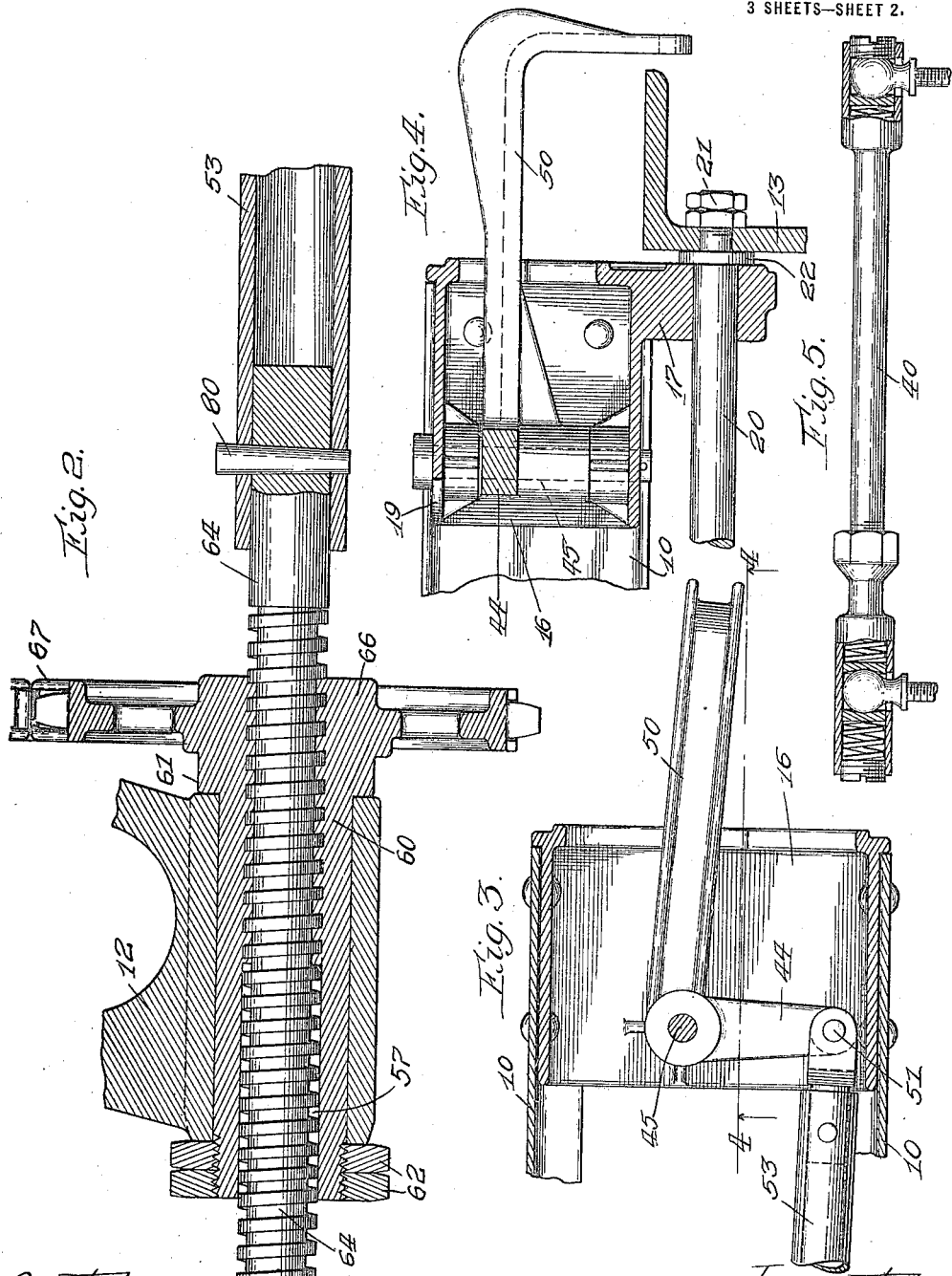

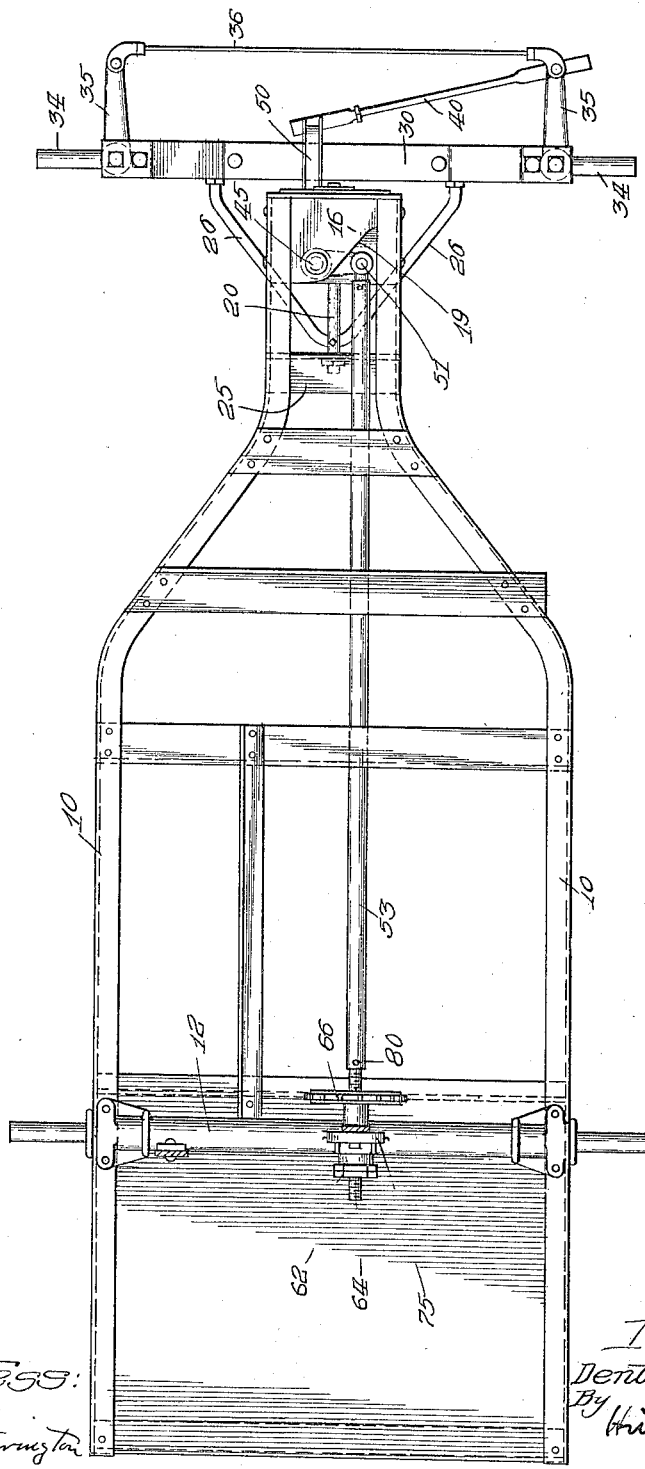

UNITED STATES PATENT OFFICE.

DENT PARRETT, OF CHICAGO, ILLINOIS.

MOTOR-VEHICLE.

1,231,292.   Specification of Letters Patent.   Patented June 26, 1917.

Application filed June 25, 1915. Serial No. 36,218.

*To all whom it may concern:*

Be it known that I, DENT PARRETT, a citizen of the United States, residing in Chicago, county of Cook, and State of Illinois, have invented new and useful Improvements in Motor-Vehicles, of which the following is a specification.

This invention relates to improvements in motor vehicles or tractors, and more especially to features of construction in the frame, axles and steering gear of such vehicles. Among the objects of the invention are to provide a frame construction with the front axle swiveled in such manner as to permit one wheel to be displaced out of the plane of the other three without distorting or straining the frame, and in combination therewith a steering gear which will properly guide the front wheels notwithstanding such rocking of the front axle as is occasioned by travel over rough ground.

A machine embodying the principles of the present invention is illustrated in the accompanying drawings in which;

Figure 1 is a view in perspective showing the front axle and the steering gear parts.

Fig. 2 is a radial section through the rear axle housing of the machine.

Fig. 3 is a horizontal section through the front part of the frame of the vehicle.

Fig. 4 is a longitudinal vertical section on the line 4—4 of Fig. 3.

Fig. 5 is a view in elevation showing the steering rod.

Fig. 6 is a top plan view showing the frame and axles of the machine.

As shown in said drawings the frame of the vehicle comprises two large heavy side members 10, preferably of channel form, which are arranged in a horizontal plane and curved toward each other and connected at their front ends. Their separated rear ends are supported by a rear axle housing 12 and their connected front ends are swiveled to and supported by a front axle 13. Between the front ends of the two frame members 10 there is inserted a hollow block 16 to which the ends of the channel members are secured and on the lower side of this block is formed a large, heavy rib 17 which is pivoted to the front axle 13 by means of a pivot shaft 20. The member 16 is rectangular in cross-section, comprising horizontal top and bottom walls, and vertical and parallel side walls; and besides connecting the frame members 10 together and supporting them upon the axle 13, it forms a support for parts of the steering gear, which are arranged within it as will be described hereinafter. In order to accommodate these parts, a portion of the top wall is omitted, as indicated at 19. The pivot shaft 20 is journaled in an opening through the rib 17 and extends through a corresponding opening in the axle 13, where it is secured by nuts 21 as shown. A collar or shoulder 22 on the pivot shaft permits of the tightening of the nuts to secure the shaft rigidly to the axle without binding the part 17 and the rear end of the pivot shaft 20 extends through and is similarly pivoted in an opening in a transverse frame member 25 which joins the two separated frame members 10, so that the weight of the forward part of the frame is carried through the block 16 and the cross member 25 upon the pivot shaft 20 and the front axle 13. A curved continuous brace rod 26 is bolted at its ends to the axle 13 and at its middle to the rear part of the pivot shaft 20, as indicated at 27, in order to brace the axle diagonally.

The front axle 13, as here shown, is formed of an angle member and a flat strap member 30 which is secured to its horizontal top web, the strap member being bent up near its ends and thence horizontally and parallel to the angle member 13 so as to form a fork in each end of the axle; and within the two forks are pivoted steering knuckles 33, 33 provided with wheel spindles 34, 34 and steering arms 35, 35. The steering arms 35 are connected by a drag link 36 and to one of them there is also connected a steering rod 40 through which the steering of the vehicle is effected. In order to actuate this steering rod a peculiarly shaped bell crank lever 44 is arranged within the hollow rectangular connecting block 16; such bell crank lever having its hub vertically arranged and pivoted within the block 16 upon a vertical pivot bolt 45, and having a short transverse horizontal arm and a long longitudinally arranged horizontal arm 50. The latter extends forward through the open forward end of the connecting block 16 and beyond the forward end of the frame of the vehicle and forward of the axle 13, where it is bent down and connected to the inner end of the steering rod 40, and the short arm of the bell crank lever is connected by a pivot pin 51 to the yoked forward end of a long tube 53, by the endwise movement of which the bell crank lever is turned about its pivot to actuate the steering rod 40 and steer the vehicle. By this arrangement of the parts the point of connection between the bell crank arm 50 and the steering rod 40 is always very near the vertical and horizontal center of the axle 13 and nearly in line with the axis of the swivel shaft 20 so that the rocking of the front axle about its pivot 20 will not materially interfere with the steering of the vehicle. The purpose of omitting a portion of the top wall of the member 16 is to facilitate the assembling of these parts.

The rear axle housing 12 is made in the form of a tubular member to rest upon the rear axle, which extends through it, and its middle part is considerably enlarged in a vertical plane and provided with a transverse cylindric opening 57 below the opening for the axle. In this transverse opening there is journaled a sleeve 60 which is free to rotate and is confined in position by means of a shoulder 61 at one end and nuts 62 threaded upon its other end, which extends beyond the opening 57. The sleeve 60 is internally threaded and engaged by a long screw 64 which is connected to the rear end of the tube 53, so that by the rotation of such sleeve the screw is worked inward and outward to impart endwise movement to the tube and thence to the steering wheels as above described. For this purpose the front end of the sleeve 60 is made integral with a sprocket wheel 66 which is driven through a sprocket chain 67 from a sprocket wheel 68 above; the latter being fixed to a shaft provided also with a hand steering wheel 70 through which the steering is effected.

At the center of the rear axle housing 12 and above the transverse opening 57 there is formed an upward projection 75 to which is attached an upright arm 76 supporting the steering wheel 70 at its upper end. The upright arm 76 is bolted to the projection 75 by means of bolts 77 and 78, one of which extends through a slotted opening 79, so that the arm 76 is angularly adjustable with respect to the axle housing 12 to vary the distance between the sprocket centers and provide for the proper tension on the sprocket chain 67.

The end of the screw 64 which is attached to the tube 53 is made a loose fit within such tube and secured by a vertical taper pin 80 so as to permit such slight bending as is necessary in the angular movement of the forward end of the tube.

I claim as my invention:

1. In a motor vehicle a tapered frame, a front axle swiveled to the forward end of such frame, a steering gear including a bell crank lever supported by such frame, steering knuckles, a drag link, and a steering rod, such steering rod being connected to an arm of such bell crank lever at a point substantially in line with the axis of rotation of such swiveled axle.

2. In a motor vehicle a tapered frame comprising channel members with their forward ends closely adjacent, a hollow block connecting such forward ends, a swiveled front axle supported by such hollow block, a steering gear including a bell crank lever supported in such hollow block and having a down-turned arm, steering knuckles, a drag link, and a steering rod, such steering rod being connected to the bottom end of the downturned arm of the bell crank at a point substantially in line with the axis of rotation of the swiveled front axle, and means for actuating such bell crank lever.

3. In a motor vehicle a tapered frame comprising channel members with their forward ends closely adjacent, a hollow block connecting such forward ends, a swiveled front axle supporting such hollow block, a steering gear including a bell crank lever supported in such hollow block and having a down turned arm, steering knuckles, a drag link and a steering rod, such steering rod being connected to such bell crank lever at a point near the center of the axle, and means for actuating such bell crank lever.

In witness whereof, I have hereunto subscribed my name this 18th day of June, 1915.

DENT PARRETT.

Copies of this patent may be obtained for five cents each, by addressing the "Commissioner of Patents, Washington, D. C."